June 24, 1930.  W. J. STAKER  1,768,380
AUTOMOBILE GAS THROTTLE CONTROL
Filed Nov. 1, 1928  2 Sheets-Sheet 2
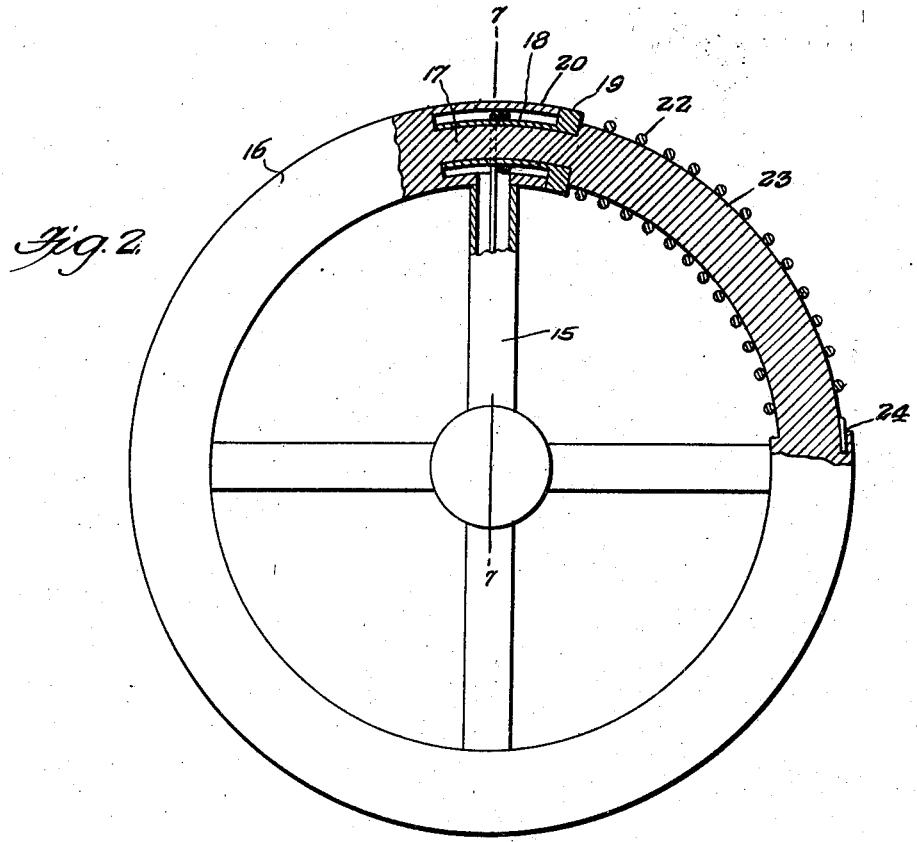
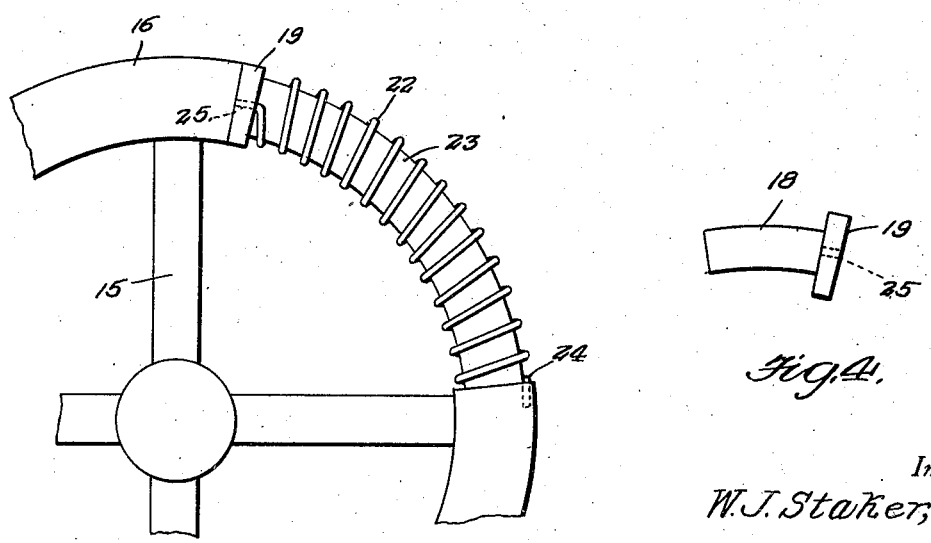
Inventor
W. J. Staker,
By Clarence A. O'Brien
Attorney Patented June 24, 1930

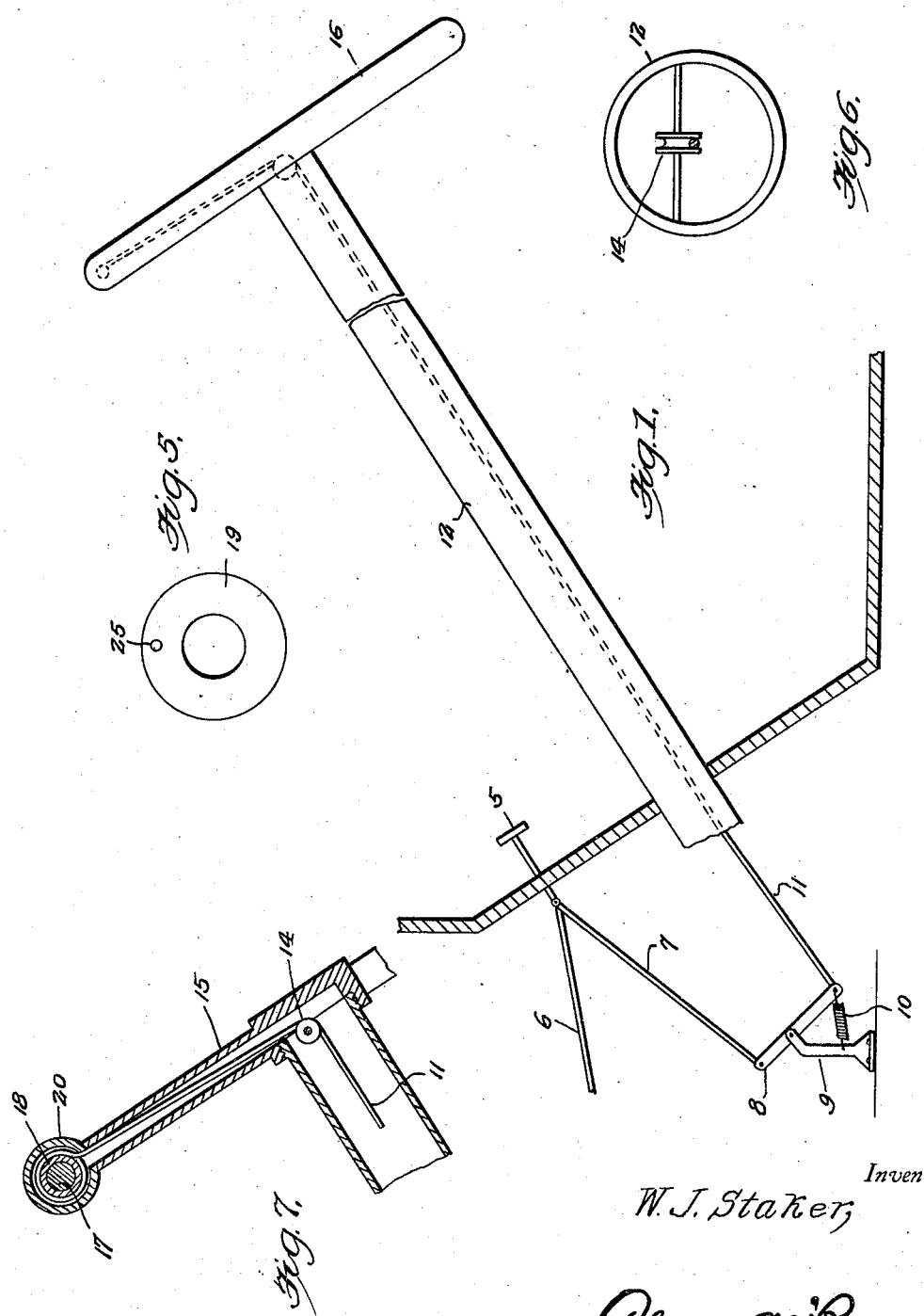

1,768,380

UNITED STATES PATENT OFFICE

WILLIAM JOSEPH STAKER, OF CAIRO, NEW YORK

AUTOMOBILE GAS-THROTTLE CONTROL

Application filed November 1, 1928. Serial No. 316,479.

The present invention relates to a control for the gas throttle of an automobile and has for its prime object to provide a mechanism operable in a handy manner from the steering wheel so that the acceleration and deceleration may be controlled by movement of the hand on the steering wheel without taking the hand from the steering wheel.

The mechanism is devised for use in driving wherein it is inconvenient or tiresome to use the usual foot accelerator.

A still further very important object of the invention resides in the provision of a mechanism of this nature which is simple in its construction, inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a sectional view through the foot board of an automobile showing my improved mechanism associated with the foot accelerator, Figure 2 is a plan view partly in section showing the hand control mechanism, Figure 3 is a fragmentary plan view of the steering gear showing the hand control mechanism, Figure 4 is a detail elevation of the rotatable reel, Figure 5 is an end elevation thereof, Figure 6 is an end elevation of the steering column showing the pulley therein, and Figure 7 is a detail section taken substantially on the line 7—7 of Figure 2.

Referring to the drawing in detail it will be seen that the numeral 5 denotes a foot accelerator having a link connection 6 with the throttle valve of a carbureter (not shown), and having a link 7 also connected thereto and connected to a lever 8 rockable intermediate its ends on a bracket 9.

A spring 10 is engaged with the bracket 9 and the lever 8 to normally hold the foot accelerator 5 in arranged position. A cable 11 leads from the lever 8 up through the steering column 12 and is trained over a pulley 14 in the upper end of the steering column 12 through a hollow spoke 15 of the steering wheel which includes the rim 16 which is split and has a pair of meeting journal members 17 for rotatably receiving a flexible reel 18 having a flange 19 at one end.

Portions 20 of the steering wheel extend over the reel so that the cable 11 may be wound thereon. The coil spring 22 is disposed about a reduced portion of the rim as is disclosed at 23 and has one end anchored as at 24 in the shoulder and the other end in a hole 25 of the flange 19. From the above detailed description, it will be seen that a person may drive with the finger of one hand on the flange 19, and by rocking or moving the finger, the flange will be actuated for rotating the reel 18 to wind the cable 11 thereon and thereby rock the lever 8 against tension of the spring 10 and pull downwardly on the foot accelerator 5 through the link 7 to accelerate the engine and by releasing the finger from the flange 19, this spring 22 and the spring 10 will return the parts to their normal position that is the idling position of the engine as will be readily appreciated.

It is thought that the construction, utility, operation and advantages of this invention will now be quite apparent to those skilled in this art without a more detailed description thereof.

The present embodiment of the invention has been disclosed in detail merely for the purpose of exemplification since in actual practice it attains the features enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a steering column, a steering wheel on the steering column, a cable trained through the steering column, a pulley in the steering column, over which the cable is trained, one spoke of the steering wheel being hollow, to which the cable is trained, a reel rotatably mounted within the rim of the steering wheel, about which said cable is windable, said reel being flanged at one end, the flange of said reel extending to the outer surface of the reel rim, whereby said flange may be engaged by the finger of the hand of the operator, exteriorly of the rim, a coil spring disposed about a portion of the rim of the steering wheel, and having one end anchored to said flange, and one end anchored to the wheel so as to hold the reel in a predetermined position.

2. In combination, a steering column, a steering wheel on the steering column, a cable trained through the steering column, a pulley on the steering column over which the cable is trained, one spoke of the wheel being hollow through which the cable is trained, the rim of said steering wheel being formed to provide an interior journal a reel rotatable on the journal concealed within said rim, and about which said cable is windable, said reel at one end being provided with a circumferential flange, the outer periphery of which flange is disposed substantially flush with the outer periphery of the wheel rim.

3. In combination, a steering column, a steering wheel on the steering column, a cable trained through the steering column, a pulley on the steering column over which the cable is trained, one spoke of the wheel being hollow through which the cable is trained, a reel rotatable within the rim of the steering wheel, about which said cable is windable, said reel being provided, at one end thereof with an outstanding peripheral flange, the peripheral edge of which flange terminates flush with the periphery of the rim of the steering wheel, a coil spring disposed about a portion of the rim of the steering wheel and having one end anchored to said flange, and one end anchored to the wheel, so as to hold the reel in predetermined position, a bracket, a lever rockably secured intermediate its ends on said bracket, a spring engaged with the bracket and one end of the lever, said cable being engaged with said one end of the lever, a link engaged with the other end of the lever, and a foot accelerator with which said last mentioned link is engaged.

In testimony whereof I affix my signature.

WILLIAM JOSEPH STAKER.